Dec. 21, 1965 N. W. PARKER 3,225,143

MULTIPLEX STEREOPHONIC RECEIVING SYSTEM

Original Filed June 14, 1961

2 Sheets-Sheet 1

INVENTOR.
Norman W. Parker
BY Mueller & Aichele
Attys.

MULTIPLEX STEREOPHONIC RECEIVING SYSTEM

Original Filed June 14, 1961 2 Sheets-Sheet 2

INVENTOR.
Norman W. Parker
BY Mueller & Aichele
Attys.

United States Patent Office 3,225,143

Patented Dec. 21, 1965

3,225,143
MULTIPLEX STEREOPHONIC RECEIVING SYSTEM

Norman W. Parker, Wheaton, Ill., assignor to Motorola, Inc., Chicago, Ill., a corporation of Illinois Continuation of application Ser. No. 117,191, June 14, 1961. This application Nov. 30, 1962, Ser. No. 242,049
4 Claims. (Cl. 179—15)

This invention relates generally to carrier wave receivers, and more particularly to a receiver for producing stereophonic sound from a received carrier wave frequency modulated by a composite signal including the sum stereo signals from two channels and the difference stereo signals modulated as a suppressed carrier wave.

This application is a continuation of my application Serial No. 117,191, filed June 14, 1961, and assigned to the assignee of the present application.

Various systems for producing stereophonic sound by radio transmission have been proposed. A multiplex system has recently been standardized wherein a composite signal is provided by the sum of the stereo signals from right and left channels, a suppressed carrier wave amplitude modulated by the difference between the stereo signals in the right and left channels, and a pilot tone signal at half the frequency of the suppressed carrier wave. This composite signal is frequency modulated on a carrier wave in the usual way. In the receiver it is necessary to reinsert the carrier to demodulate the multiplex suppressed carrier wave to obtain the difference signal and then to combine the sum and difference signals to provide the individual right and left stereo signals.

The receiver circuitry required to reproduce the received wave has been relatively complex inasmuch as the carrier generated in the receiver must be synchronized with the pilot carrier to provide the demodulating oscillations, and then a circuit for demodulating the difference modulated wave is required, and a matrix for combining the difference signals obtained with the sum signals. Also the receiver must be suitable for use with monaural signals and it is therefore necessary to disable the carrier oscillator and to pass the monaural signals to the audio amplifiers of both channels, so that it is reproduced thereby.

It is therefore an object of the present invention to provide a simple and improved frequency modulation receiver for reproducing multiplex stereo signals and monaural signals.

A further object is to provide a frequency modulation receiver including a demodulation circuit for a suppressed carrier multiplex signal which directly combines the modulated difference stereo signal, the demodulating wave and the sum stereo signal to produce right and left stereo signals.

Another object of the invention is to provide a frequency modulation receiver for receiving monaural signals and multiplex stereo signals wherein the circuit for demodulating the multiplex signals is disabled in the absence of a pilot tone signal and the monaural signal is translated thereby and applied to the two stereo channels of the receiver and reproduced thereby.

A feature of the invention is the provision of a stereo multiplex receiver including first and second circuits each including a rectifier to which the directly modulated sum signal and the suppressed carrier modulated difference signal are applied, and a carrier reinsertion circuit which selects the pilot tone signal and produces a wave at the frequency of the suppressed carrier wave and applies the same to the two rectifiers and each demodulates one phase of the suppressed carrier modulated difference signal. The difference signals are combined with the sum signals in the rectifier circuits to produce the right channel stereo signal in one circuit, the left channel stereo signal in the other circuit, and the two stereo signals are amplified and reproduced to provide stereophonic sound reproduction.

A further feature of the invention is the provision of a multiplex stereo reproducing system as described in the preceding paragraph wherein the rectifiers are biased to be continuously conducting in the absence of the supplied carrier wave so that monaural signals are passed by both branches and applied to both reproducers, and the system is automatically conditioned to reproduce monaural signals in the absence of a pilot tone signal. When a multiplex stereo signal is received the pilot tone causes the carrier wave to be applied to the rectifiers so that the rectifiers derive the envelope of the modulated wave which is the stereo difference signal.

Another feature of the invention is the provision of a stereo multiplex receiver including two separate branches for deriving the right and left stereo signals, each of which includes a pair of rectifiers connected with opposite polarities and with the reinserted carrier wave being applied thereto with opposite phases so that the carrier wave is balanced out in each branch circuit.

Still another feature of the invention is the provision of a stereo multiplex receiver including a detector circuit for deriving stereo signals having two branches, each of which includes a triode tube which derives and amplifies the signals of one channel, so that the stereo signals are at high level and can be directly applied to power amplifiers which drive the loudspeakers of the stereo channels.

The invention is illustrated in the accompanying drawings wherein.

In accordance with the invention, a radio receiver is provided to derive first and second stereophonic sound signals from a received multiplex frequency modulated carrier wave having modulation components including a first signal component formed by the sum of the right and left stereo sound signals, a second signal component formed by the difference of the right and left stereo signals provided as an amplitude modulated suppressed carrier wave, and a third signal component formed by a pilot tone signal at one half the carrier frequency of the suppressed carrier wave. The composite signal including the sum stereo signal, the difference modulated wave and the pilot tone signal is detected in a frequency modulation detector circuit. The sum signal and the suppressed carrier modulated difference signal are fed to a pair of detector or rectifier branch circuits. The pilot tone is selected and amplified and either doubled in frequency, or used to synchronize an oscillator having a natural frequency at twice the pilot tone frequency. The wave at the carrier frequency of the suppressed carrier amplitude modulated wave is coupled to the two detector or rectifier branch circuits. The applied wave supplies the carrier to the suppressed carrier wave so that a normal amplitude modulated wave is produced, and the rectifiers detect the envelope of this wave. The rectifiers may be connected with opposite polarities, or the oscillations may be applied in opposite phases so that each rectifier detects one phase of the modulated wave. The demodulated difference signals at the two rectifiers are therefore 180° out of phase and when combined with the sum signals, the right stereo signals will be added and the left stereo signals will be cancelled in one channel, and the left stereo signals will be added and the right stereo signals will be cancelled in the other channel. The separate right and left stereo signal components are then separately reproduced in audio amplifier and speaker systems. A single diode, or pair of diodes connected in a balanced manner, can be used in each detector branch circuit, or triode tubes can be used to provide high level detector outputs.

As the rectifiers are biased so they conduct continuously, for monaural operation when no demodulating wave is applied thereto, both channels will reproduce the monaural audio intelligence applied from the FM detector circuit. As there is no pilot tone during monaural operation, a doubler for producing the demodulating wave will have no output, and when an oscillator is used, it is biased so that it is not conducting in the absence of the pilot tone.

Figure 1:
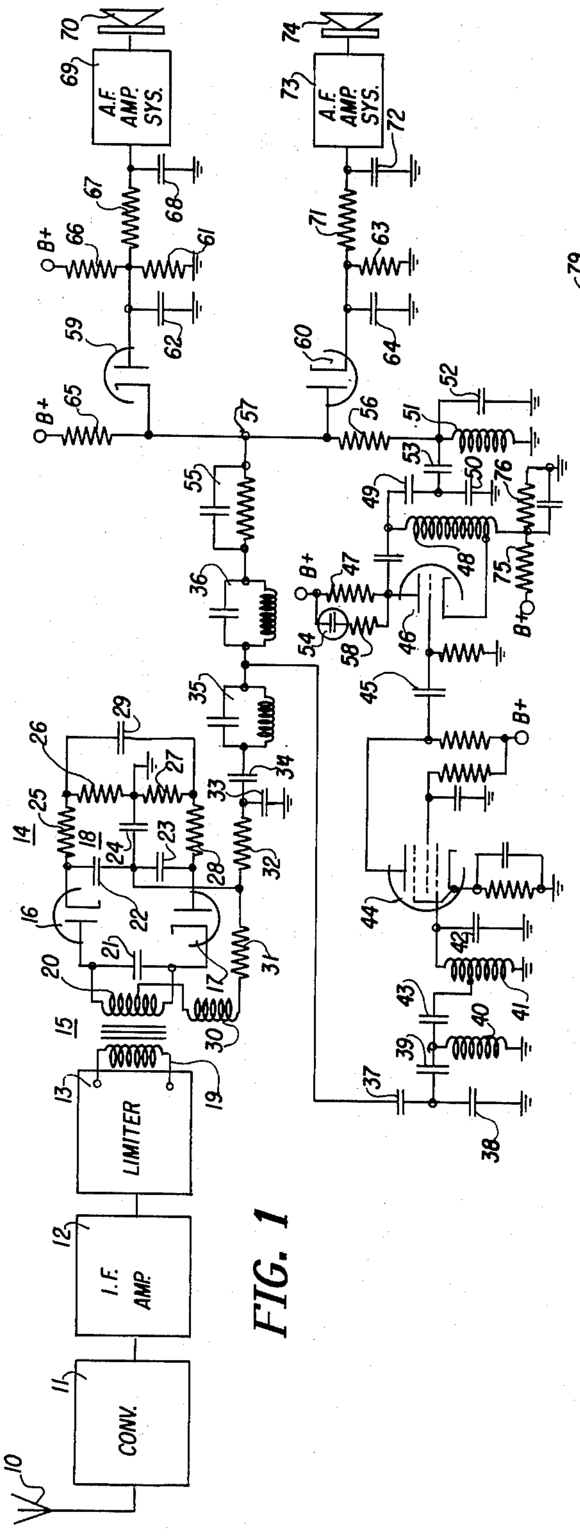
FIG. 1 is a schematic diagram of a frequency modulation stereo receiver with the frequency modulation detector and the stereo signal detecting circuits shown in detail.

In the receiver of FIG. 1, the frequency modulated carrier wave containing the sum signal of the right and left stereo channels, their difference signal amplitude modulated on a suppressed carrier wave, and a pilot tone of one-half of the suppressed carrier frequency is received by antenna 10. The selected wave is converted to intermediate frequency in converter 11. The intermediate frequency wave is amplified and limited in IF amplifier 12 and limiter 13 respectively. The limited wave is applied to the FM detector 14 through transformer 15.

The composite signal containing the stereo sum signal, the difference stereo signal modulated on a suppressed carrier wave, and the pilot tone are detected in frequency modulation detector 14. The secondary winding 20 of transformer 15 is connected between the plate of diode 16 and the cathode of diode 17. A capacitor 21 is connected in shunt with winding 20 forming a discriminator circuit at the selected frequency. Winding 30 of transformer 15 is connected to the center tap of winding 20 and through resistor 31 to the network 18 to provide a signal having a reference phase to the diodes 16 and 17. The detected signals are developed across network 18, consisting of capacitors 22 and 23 connected in series between the cathode of diode 16 and the plate of diode 17 and shunted by resistors 25, 26, 27 and 28 in series. A large capacitor 29 is bridged across resistors 26 and 27. The junction of resistors 26 and 27 is connected to ground. The detected audio intelligence is derived across capacitor 24 and applied to the filter section including resistor 32 and capacitor 33.

The detected signal which includes the directly modulated sum signal and the difference signal provided as a suppressed carrier amplitude modulated wave, together with the pilot tone, are applied through coupling capacitor 34 to trap 35. This trap is provided to remove higher frequency subcarriers which may be applied to the frequency modulated wave for additional communication channels. At the output of trap 35 is a second trap 36 to further attenuate the higher frequency subcarriers and apply the sum signal and the difference modulated subcarrier wave to the stereo signal deriving circuit. Also connected to the output of trap 35 is a filter for the 19 kilocycle pilot tone.

The pilot tone filter includes coupling capacitor 37, a first filter section including capacitors 38 and 39 and coil 40, and a second filter section including coil 41 and capacitor 42, to which signals are applied from the first filter section through coupling capacitor 43. The pilot tone selecting filter therefore is a double tuned circuit which selects the pilot tone and excludes adjacent frequencies. The pilot tone frequency is amplified in pentode tube 44, and the amplified signal is applied through coupling condenser 45 to the regenerative amplifier 46. This amplifier has a tank circuit formed by coil 48 and capacitors 49 and 50 which is tuned to 38 kilocycles (double the pilot tone frequency), to provide a wave for demodulating the suppressed carrier modulated wave. To provide further filtering of the 38 kilocycle wave, and exclusion of the 19 kilocycle tone, an additional filter section is provided including coil 51 and capacitor 52, which is coupled to the tank circuit through coupling capacitor 53. The tank circuit and the additional filter section form a double tuned circuit to provide a 38 kilocycle demodulating wave which is substantially free of other frequency components. This demodulating wave is applied through resistor 56 to terminal 57.

The sum signal and the difference modulated subcarrier wave at the output of trap 36 are applied through resistor capacitor network 55 to terminal 57, where the 38 kilocycle carrier is combined so that the carrier wave is added to the suppressed carrier wave. This produces a normal double side band amplitude modulated wave, the envelope of which may be detected. This composite signal is applied to diode rectifiers 59 and 60 which are connected with opposite polarities. Resistor 61 shunted by capacitor 62 forms the load for the rectifier 59 and resistor 63 shunted by capacitor 64 forms the load for rectifier 60. Resistor 65 connected to B+ provides a positive potential on the anode of rectifier 60 and resistor 66, also connected to B+, provides a greater positive potential on the anode of rectifier 59 than that on its cathode. Accordingly, the two diodes 59 and 60 are both biased to be conducting.

In the rectifier 59, the envelope of the subcarrier modulated wave of one polarity is detected and this appears across load resistor 61 together with the sum signal which is conducted through the diode. Accordingly, across resistor 61 there appears the sum signal L+R and the difference signal L—R. The right or R signals are opposite and balanced out, and the left signal alone is applied through de-emphasis network including resistor 67 and capacitor 68 to the left channel audio amplifier 69 and loudspeaker 70. The diode 60 is connected with opposite polarity so that the opposite polarity of the envelope of the subcarrier wave is derived therein. Accordingly, across resistor 63 will be developed the L+R sum signal and the minus (L—R) difference signal. The left or L signals therefore oppose and are balanced out across resistor 63, and the right signal alone is applied through the de-emphasis net work including resistor 71 and capacitor 72 to the right channel audio amplifier 73 and loudspeaker 74.

The circuit which has been described is also suitable for reception of monaural transmissions, this being applied directly as frequency modulation of the main carrier wave. For monaural transmission there is no subcarrier wave and no pilot tone. Inasmuch as the diodes 59 and 60 are biased to be continuously conducting, the monaural signal will be applied through both diodes and will appear at both loudspeakers 70 and 74. It is desired to eliminate the 38 kilocycle demodulating wave and this is accomplished by biasing the regenerative amplifier to be nonconducting in the absence of the pilot tone. A voltage divider formed by resistors 75 and 76 applies a positive potential to the bottom terminal of coil 48, which is in turn applied to the cathode of tube 46. Accordingly, the tube 46 is biased to be nonconducting and will produce no output in the absence of a pilot tone. Therefore during monaural transmissions, no tone is applied to the circuit including rectifiers 59 and 60. When the pilot tone is present and is amplified by pentode tube 44, the signal applied to the oscillator is of sufficient amplitude to cause the same to oscillate and provide the wave required to demodulate the suppressed carrier wave.

An indicator may be provided to show when a stereo transmission is being received. This is shown in FIG. 1, and is provided by a neon bulb 54, connected in series with resistor 58 across resistor 47. Resistor 47 develops a voltage thereacross when the amplifier 46 conducts and this voltage causes the neon bulb 54 to glow. Accordingly, when the 19 kilocycle tone is received, and this overcomes the bias on amplifier 46 so that it conducts, the neon bulb 54 will glow to show that a stereo transmission is being received.

Figure 2:
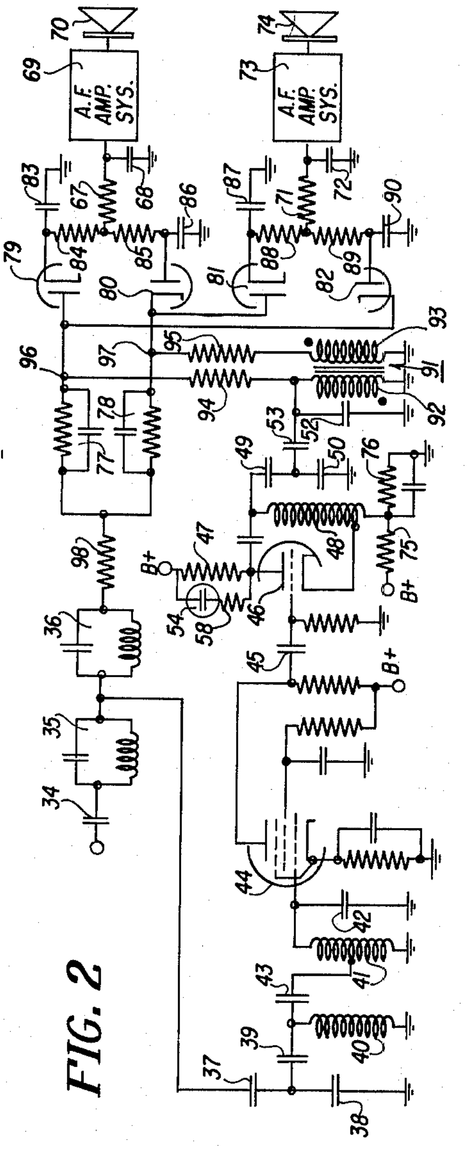
FIG. 2 illustrates an alternate embodiment of the stereo detector circuit which includes a pair of diodes connected in a balanced manner for deriving the signal for each channel.

Referring to FIG. 2, a partial schematic is shown to be taken in conjunction with FIG. 1. Components with the same function are given the same reference numerals. As described in FIG. 1, the composite signal containing the stereo sum signal, the difference stereo signal modulated on a suppressed subcarrier wave, and the pilot tone are applied from detector 14 to network 35 through capacitor 34. The sum signal and the difference modulated subcarrier wave are applied from the output of filter 35 to the audio detector circuit through filter network 36 and resistor 98. The pilot tone signal is applied to the input of tone amplifier 44 through the pilot tone filter network consisting of components 37–43. The pilot tone frequency is amplified in pentode tube 44, the output of which is applied through capacitor 45 to the input of tube 46 operating as a regenerative doubler amplifier to provide the 38 kilocycle carrier signal. Regenerative amplifier 46 includes transformer 91 connected to its output with windings 92 and 93 connected in reverse polarity.

The sum signal and the difference modulated subcarrier wave are applied through resistor-capacitor networks 77 and 78 to terminals 96 and 97 respectively. The carrier frequency from amplifier 46 is also applied to these terminals through series resistors 94 and 95, and is added to the suppressed subcarrier for producing the normal double side-band amplitude modulated wave. The carrier wave signal applied to terminal 96 is reversed in phase with respect to the carrier wave signal applied to terminal 97 due to the 180° phase shift effected in winding 93 of transformer 91. The envelope of the suppressed subcarrier is detected and combined with the sum signal in the manner previously described to obtain the individual right and left stereo signal components for reproduction in separate loudspeaker systems.

Each stereo detector channel includes a pair of diodes connected in push-pull. The left channel includes diodes 79 and 80 and the right channel includes diodes 81 and 82. The diodes of each channel are connected in opposite polarity; the plate of diode 79 being connected to the cathode of diode 82, and the cathode of diode 80 being connected to the plate of diode 81. The signals are applied to the right and left stereo detector channels in parallel.

For the derivation of the left stereo signal component, diode 79 rectifies the envelope having one polarity of the modulated subcarrier wave at terminal 96 and diode 80 rectifies the envelope having a reverse polarity of the modulated subcarrier wave at terminal 97. By connecting diodes 79 and 80 in reverse polarity relation, the detected envelopes will be added when combined at the common junction between load resistors 84 and 85 and the subcarrier wave components will be balanced out. This greatly reduces the distortion that may occur in the detection process. Similar to the manner described in FIG. 1, the sum signal L+R and the difference signal L−R are combined in the detector channel such that the right stereo signals are cancelled and the left stereo signals alone are applied through de-emphasis network including resistor 67 and capacitor 68 to the left channel audio amplifier 69 and loudspeaker 70.

A similar action takes place in the right stereo channel. Diodes 81 and 82 are connected in reverse polarity with respect to diodes 79 and 80 wherein the left stereo signals are cancelled at the junction of load resistors 88 and 89, with the right stereo signals alone being applied through de-emphasis network including resistor 71 and capacitor 72 to the right channel audio amplifier 73 and loudspeaker 74.

Figure 3:
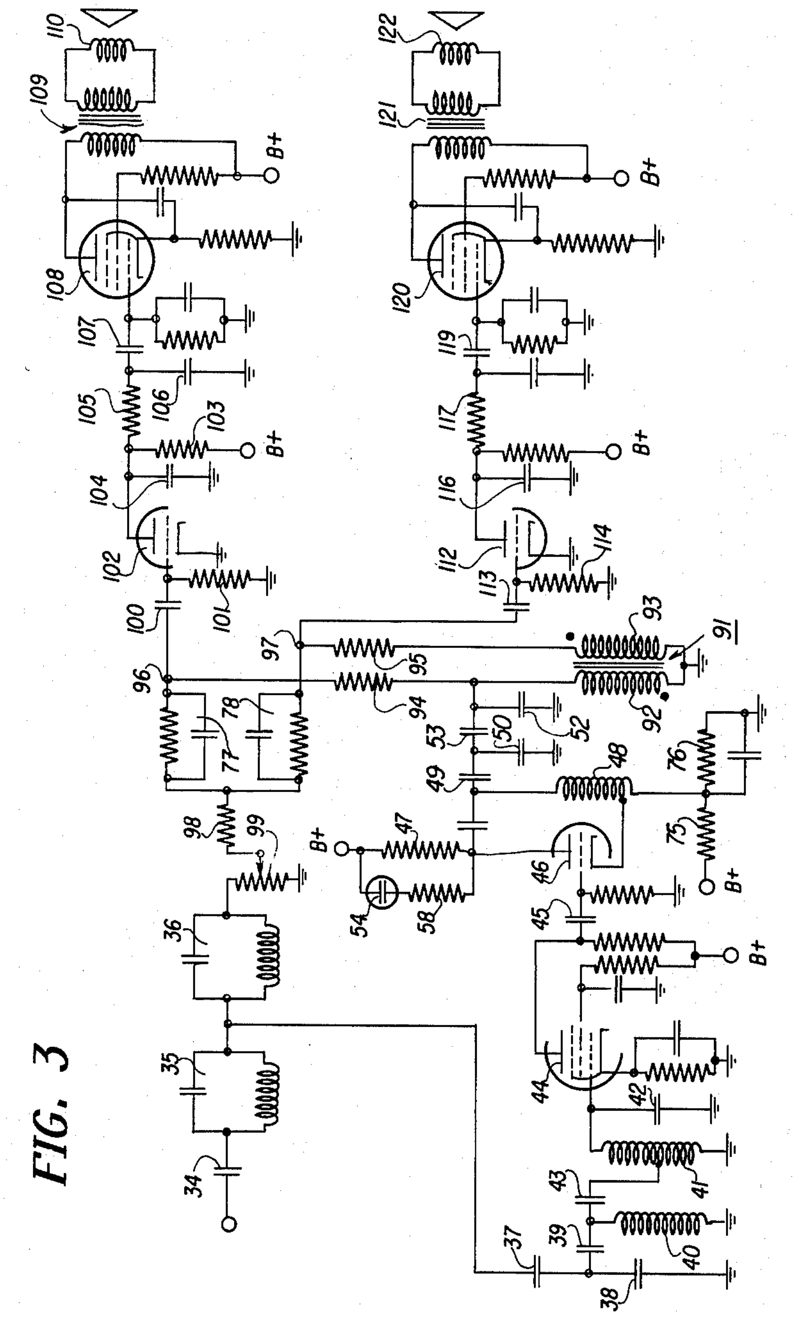
FIG. 3 is a further embodiment of the stereo detector circuit in which triode rectifier tubes are used.

In FIG. 3 there is shown a further embodiment of the invention. This circuit corresponds to the circuit of FIG. 2 up to the terminals 96 and 97 except for the addition of a volume control potentiometer 99 between the filter network 36 and the resistor 98. The signals at point 96 are applied through coupling capacitor 100 and across resistor 101 to a triode detector 102. Operating potential is applied to the triode from B+ through resistor 103, and the carrier frequency is bypassed by capacitor 104. The triode amplifies as well as detects the signal to provide a high level output signal which may be applied directly to a power amplifier. The detected difference signal L−R is combined with the sum signal L+R so that the output across the load resistor 103 constitutes the L or left channel signal of the stereo system. This is applied through the de-emphasis network including resistor 105 and capacitor 106, and through coupling capacitor 107, to pentode power amplifier 108. The output from the amplifier 108 is applied through transformer 109 to loudspeaker 110.

The signal from point 97 is similarly fed to a triode detector 112 through coupling capacitor 113. The grid of the triode 112 is returned to ground through resistor 114. Inasmuch as the subcarrier wave is applied to point 97 from winding 93, it is of opposite phase to that applied to the triode 102. This is effective to reverse the difference signal L−R so that the output of the triode developed across the load resistor 115 is the R or right channel signal. The subcarrier frequency is bypassed by capacitor 116. The right channel signal is passed through de-emphasis network including resistor 117 and capacitor 118, and through coupling capacitor 119, to the power amplifier 120. This is a pentode power amplifier of known design to produce an output sufficient for driving a loudspeaker. The output is applied through transformer 121 to loudspeaker 122.

The system of FIG. 3 provides an inexpensive circuit for stereo reproduction. By using triode detector tubes, high level outputs are provided which are sufficient for driving pentode power amplifiers which in turn drive the speakers. The circuits of FIGS. 1 and 2 which provide low level outputs may be used in systems which have stereo amplifiers suitable for use with low level inputs such as provided by stereo tape pickups. In such case the stereo amplifiers present will operate from low level inputs, and there is no advantage in having a high level detector output. However, in cases where the amplifiers are not required for other purposes, the amplifiers can be simplified by use of the circuit of FIG. 3.

The circuits described have been found to be highly effective in providing reproduction of frequency modulation stereo radio broadcast transmissions. The circuits are automatically operative for either stereo or monaural broadcast reception whichever may be required at any time. It is apparent that the invention may be practiced by extremely simple circuits, or that more complex circuits may be provided for particular applications, with each of the circuits disclosed providing effective operation.

I claim:

1. A multiplex stereophonic receiver for deriving a right stereo signal and a left stereo signal from a received signal which includes a sum signal composed of the sum of the right and left stereo signals, a difference signal composed of a suppressed carrier wave amplitude modulated by the difference between the right and left stereo signals, and a pilot tone signal having a frequency for reconstituting the suppressed carrier wave, said receiver including in combination, circuit means for deriving the sum signal and the difference signal with a demodulating wave of suppressed carrier frequency controlled by the pilot tone signal, a demodulating circuit to develop the right and left signals including first and second detector circuits connected to said circuit means, said detector circuits each having a diode connected with polarities to conduct on opposite phases of the demodulating wave, the sum and difference signals being translated in said demodulating circuit and said demodulating wave having an amplitude and phase so that a right stereo signal component is developed by conduction and nonconduction of said first detector circuit and a left stereo signal component is developed by conduction and nonconduction of said second detector circuit, direct current supply means to forward bias said diodes with a potential such that said diodes are conductive in the absence of the demodulating wave for conducting monaural signals therethrough from said circuit means, and first and second output circuits coupled to said first and second detector means respectively for translating the right and left stereo signals therefrom.

2. A multiplex stereophonic receiver for deriving a right stereo signal and a left stereo signal from a received signal which includes a sum signal composed of the sum of the right and left stereo signals, a difference signal composed of a suppressed carrier wave amplitude modulated by the difference between the right and left stereo signals, and a pilot tone signal having a frequency and phase for reconstituting the suppressed carrier wave, said receiver including in combination, circuit means for deriving the sum signal and the difference signal with a demodulating wave of suppressed carrier frequency which is controlled in phase and frequency by the pilot tone signal, first and second envelope rectifying means coupled to said circuit means, said rectifying means each having one diode connected with polarities so that each one conducts on an opposite phase of the demodulating wave, the sum and difference signals being translated in each of said envelope rectifying means and the demodulated wave having an amplitude and phase so that only the right stereo signal is developed by conduction and non-conduction of said first diode and only the left stereo signal is developed by conduction and nonconduction of said second diode, and first and second output circuits coupled to said first and second rectifying means respectively for translating the right and left stereo signals therefrom.

3. Signal translation apparatus for deriving a right stereo signal and a left stereo signal from a composite of signals which includes a sum signal formed by the sum of the right and left stereo signals, a difference signal formed by a suppressed carrier wave amplitude modulated by the difference between the right and left stereo signals, and a pilot tone signal having a frequency one-half that of the suppressed carrier wave, said apparatus including in combination, first means for deriving the sum signal and the difference signal, second means for deriving the pilot tone signal means coupled to said second means for producing oscillations at the frequency of the suppressed carrier wave in response to and phase locked with the pilot tone signal, a detector circuit including first and second branches, each of said branches including a non-linear rectifying device and an associated detector load circuit to form an envelope detector circuit in each of said branches, means coupled to said first means and to said oscillation producing means and to said detector circuit for applying the sum signal and the difference signal and the oscillations to said branches of said detector circuit, the oscillations being applied to said rectifying devices of each branch with a phase and amplitude such that said first and second branches conduct on opposite phases of the oscillations so that envelope detection takes place and right stereo signals are developed in said first branch of said detector circuit and left stereo signals are developed in said second branch of said detector circuit, and an output circuit means including first and second portions respectively coupled to said detector load circuit for translating the right and left stereo signals.

4. Signal translation apparatus for deriving a right stereo signal and a left stereo signal from a composite of signals which includes a sum signal formed by the sum of the right and left stereo signals, a difference signal formed by a suppressed carrier wave amplitude modulated by the difference between the right and left stereo signals, and a pilot tone signal having a frequency one-half that of the suppressed carrier wave, said apparatus including in combination, first means for deriving the sum signal and the difference signal, second means for deriving the pilot tone signal, means coupled to said second means for producing oscillations at the frequency of the suppressed carrier wave in response to and phase locked with the pilot tone signal, a detector circuit including first and second branches, each of said branches including a multielectrode rectifying device and an associated detector input circuit to form an envelope detector circuit in each of said branches, each rectifying device having a pair of input electrodes connected to one of said input circuits and further having an output electrode for deriving an amplified form of a detected signal, means coupled to said first means and to said oscillation producing means and to said detector input circuits for applying the sum signal and the difference signal and the oscillations to said branches of said detector circuit, the oscillations being applied to said rectifying devices of each branch with a phase and amplitude such that said first and second branches conduct on opposite phases of the oscillations and envelope detection takes place with only right stereo signals developed in said first branch of said detector circuit and only left stereo signals developed in said second branch of said detector circuit, and an output circuit means including first and second portions respectively coupled to said output electrodes of said rectifying devices for translating amplified forms of the right and left stereo signals.

References Cited by the Examiner

UNITED STATES PATENTS

| | | | |
|---|---|---|---|
| 3,040,132 | 6/1962 | Wilhelm | 179—15 |
| 3,105,117 | 9/1963 | Frank | 179—15 |
| 3,122,610 | 2/1964 | Csicsatka | 179—15 |
| 3,133,993 | 5/1964 | De Vries | 179—15 |

OTHER REFERENCES

Browne: British Communications and Electronics, March 1960, pages 204, and 205.

Electronic Engineering, April 1960, pages 238 and 239.

DAVID G. REDINBAUGH, *Primary Examiner.*